US012800382B2

(12) United States Patent
Burkhard et al.

(10) Patent No.: US 12,800,382 B2
(45) Date of Patent: Nov. 17, 2026

(54) STRUCTURAL BODY OF A WEIGHING SENSOR

(71) Applicant: Mettler-Toledo GmbH, Greifensee (CH)

(72) Inventors: Hans-Rudolf Burkhard, Wila (CH); Bruno Lüchinger, Flawil (CH); Andreas Metzger, Männedorf (CH)

(73) Assignee: Mettler-Toledo GmbH, Greifensee (CH)

( * ) Notice: Subject to any disclaimer, the term of this patent is extended or adjusted under 35 U.S.C. 154(b) by 690 days.

(21) Appl. No.: 18/265,145

(22) PCT Filed: Dec. 3, 2021

(86) PCT No.: PCT/EP2021/084135
§ 371 (c)(1),
(2) Date: Jun. 2, 2023

(87) PCT Pub. No.: WO2022/117801
PCT Pub. Date: Jun. 9, 2022

(65) Prior Publication Data
US 2024/0027256 A1 Jan. 25, 2024

(30) Foreign Application Priority Data
Dec. 4, 2020 (EP) .................................... 20212019

(51) Int. Cl.
*G01G 21/28* (2006.01)
*B33Y 10/00* (2015.01)
(Continued)

(52) U.S. Cl.
CPC .............. *G01G 21/28* (2013.01); *B33Y 10/00* (2014.12); *B33Y 80/00* (2014.12); *G01G 7/02* (2013.01)

(58) Field of Classification Search
None
See application file for complete search history.

(56) References Cited

U.S. PATENT DOCUMENTS 4,799,561 A * 1/1989 Komoto .................. G01G 7/02 177/229
5,340,951 A 8/1994 Hungerbühler et al.
(Continued)

FOREIGN PATENT DOCUMENTS

DE 19605087 A1 8/1997
EP 291258 A * 11/1988
(Continued)

OTHER PUBLICATIONS

PCT/EP2021/084135 International Search Report, Mar. 31, 2022. pp. 1-5. (Year: 2022).*

*Primary Examiner* — John E Breene
(74) *Attorney, Agent, or Firm* — Standley Law Group LLP; Jeffrey S. Standley; Adam J. Smith

(57) ABSTRACT

The invention relates to a structural body of a weighing sensor with a Roberval mechanism, including a first part with a fixed leg of the Roberval mechanism, a second part with a movable leg of the Roberval mechanism, a third part with an upper traverse link of the Roberval mechanism, a fourth part with a lower traverse link of the Roberval mechanism, a fifth part with a lever arrangement connecting the movable leg to an output side for sensory measurement, and a sixth part comprising a traverse link coupling the movable leg to the lever assembly, at least one of the first to fifth parts including a region of the topology of a handle body of at least type one, the at least one hole of which is penetrated by at least one portion of another of the first to sixth parts integrally connected to said region.

18 Claims, 8 Drawing Sheets

(51) Int. Cl.
*B33Y 80/00* (2015.01)
*G01G 7/02* (2006.01)

(56) References Cited

U.S. PATENT DOCUMENTS

| | | | | |
|---|---|---|---|---|
| 7,091,428 | B2 * | 8/2006 | Ikeshima ............. | G01G 3/1412 73/1.13 |
| 7,429,705 | B2 | 9/2008 | Genoud et al. | |
| 8,766,113 | B2 | 7/2014 | Kusumoto et al. | |
| 9,612,149 | B2 * | 4/2017 | Burkhard ............. | G01G 19/414 |
| 2017/0284857 | A1 * | 10/2017 | Hauck .................... | G01G 21/23 |
| 2020/0408590 | A1 * | 12/2020 | Gottfriesen et al. ... | G01G 21/26 |

FOREIGN PATENT DOCUMENTS

| | | | | |
|---|---|---|---|---|
| EP | 3677363 A1 * | 7/2020 | ............. | B33Y 10/00 |
| WO | WO2088/125099 A2 * | 10/2008 | ........... | G01G 21/244 |

* cited by examiner

STRUCTURAL BODY OF A WEIGHING SENSOR

CROSS-REFERENCE TO RELATED APPLICATIONS

This application is a national stage entry of PCT/EP2021/084135 filed Dec. 3, 2021, which claims priority to EP 20212019.2 filed Dec. 4, 2020, the disclosures of each of which are hereby incorporated by reference as if fully restated herein.

BACKGROUND AND SUMMARY

The invention relates to a structural body of a weighing sensor with Roberval mechanism, in particular for a weighing sensor according to the principle of electromagnetic force compensation, and a method for its production.

In particular, the invention relates to a structural body of a weighing sensor with Roberval mechanism, comprising a first part with the fixed leg of the Roberval mechanism, a second part with the movable leg of the Roberval mechanism, a third part with the upper traverse link of the Roberval mechanism, a fourth part with the lower traverse link of the Roberval mechanism, a fifth part with a lever arrangement connecting the movable leg to an output side used for sensory measurement, and a sixth part with a coupler, coupling the movable leg to the lever arrangement.

Such structural bodies of weighing sensors are well known in the state of the art, and there is a current tendency to make the structural bodies as compact as possible so that they take up as little space as possible in a weighing device using the weighing sensor, and are thus particularly suitable for applications in which the weighing device has a number of such weighing sensors. In addition, it is understood that the weighing sensors should also have the highest possible weighing accuracy.

With regard to these requirements, structural bodies in the form of a so-called monoblock have been developed in the state of the art and have essentially become established in this form, as disclosed for example in DE 196 05 087 A1 or EP 2 397 824 A1. Such structural bodies are manufactured by starting from a cuboid block of material with a similar shape and size of a VHS video cassette, the long side of which corresponds to the longitudinal direction to which the traverse link of the Roberval mechanism are parallel, the second longest side of which runs in the direction of the load, so that the two end regions with respect to the longitudinal direction belong, on the one hand, to the fixed leg and, on the other hand, to the movable leg of the Roberval mechanism. By removing material from this monobloc in the form of perforations or cutting lines by piercing the block transversely, the monobloc is given a structure such that the traverse links are defined at the top and bottom and the inner area enclosed by the legs and these traverse links running at the top and bottom of the Roberval mechanism divided into different functional areas, namely on the one hand areas belonging to the fixed leg and on the other hand a lever arrangement with usually one, two or three levers, which are mounted on the fixed leg by means of corresponding bearings and are connected to the movable leg or, if applicable, between the levers by means of so-called couplings. The separation between the levers and the material belonging to the fixed leg is essentially only thin separation lines (the advantages of which are described, for example, in DE 41 19 734 A1), since, due to the measuring principle according to electromagnetic force compensation, a significant movement of the levers exceeding the dimension of the separation line does not occur anyway. The last lever in the force transmission path typically has two transverse bores, via which a lever extension is mounted, on the free end area of which the coupling to the electromagnetic force compensation and the position sensor required for this weighing principle is provided, as is well known to those skilled in the field.

The technique of this minimal material removal through transverse perforation, for example by wire EDM, is now so developed that even the incorporation of a sub-Roberval mechanism for coupling the weight load of an internal reference weight can be incorporated into the monoblock, even with material weakening in the transverse direction, such as in EP 2 397 824 A1.

The invention is based on the objective of further designing a structural body of the type mentioned above with the goal of a satisfactory combination of the smallest possible installation space and the highest possible weighing accuracy.

This problem is solved by the invention in device terms by a further development of the structural body of the type mentioned at the beginning, which is essentially characterized in that at least one of the first to fifth parts has an area of the topology of a handle body of at least type one, at least one hole of which is penetrated by at least one portion of another of the first to sixth parts which is integrally connected to this area.

Due to the further development according to the invention, at least one area of the installation space occupied by the structural body, which is conventionally only used for exactly one functional part of the structural body, can now be used by at least two different functional parts, or an equivalent support structure with different extension directions can be created while saving material. For example, by designing the area in the topology of a handle body, the space formed by the hole of the handle body is used to provide other functional parts with targeted access to an area of space considered desirable for an optimized path for the flow of the introduced force. For example, the load receptor of the movable leg can be positioned more variably and still be supported in a favorable manner by passing support struts through areas of the fixed leg which are formed in the topology of a handle body. Sections of the upper traverse link can also be guided, for example, through areas of the movable leg, which also entails greater flexibility in the positioning of the load receptor, or enables more reliable support and an improved power transmission path of the structural body. The last lever of the lever arrangement can, for example, be guided through a previously inaccessible area of the fixed leg, so that a simplification of the lever arrangement up to the coupling to the electromagnetic force compensation is achievable.

By designing areas of the functional parts in the topology of a handle body, in particular also of type two or more, the overall weight can be reduced while the rigidity remains the same and the structural body is therefore smaller in size, so that, based on the same weight of the structural body, greater compactness and/or lower material requirements can be achieved. For example, in particular, areas of the fixed leg can be formed in a structure consisting of a large number of struts, which can consist of a plurality of longitudinal struts extending predominantly in the longitudinal direction, a plurality of vertical struts extending predominantly in the load direction and a plurality of transverse struts extending predominantly in the transverse direction, instead of solidly formed areas. Due to the one-piece connection between the area of the topology of a handle body and the section of, for example, another functional part penetrating it, the one-piece nature of the connection also ensures that no additional space is required for mechanical connections or adapters to link two areas that are not connected as one piece; in this respect, the invention further has advantages of the mono-block technology explained above.

An example of the topology of a handle body of type one is known to be a torus (doughnut), whereby, due to the topological property of the handle body, the shaping of the border of the "hole" (or several holes) is not important, for example, a closed frame also represents an example of a handle body of at least type one. In a preferred variant, the topology of the handle body of one or more of the functional parts is achieved by a frame-like arrangement of three or more struts.

The design consisting of a large number of individual struts joined together in one piece is also disclosed by the invention as being advantageous in its own right, irrespective of any penetrations. Thus, the invention also provides a structural body according to the preamble of claim 1, which has at least 12, also 16, in particular 24 longitudinal struts, at least 4, also 2 vertical struts and at least 4, also 8 transverse struts as defined above. At least 8, in particular at least 16 of them can preferably be provided as diagonal struts, that is to say with an extent in one direction that is smaller by order of magnitude compared to the extent in the other two directions.

In one possible embodiment, functional parts can also be mutually intertwined, so the penetrating section can be part of an area intertwined with the penetrated area, which also has the topology of a handle body of at least type one. In this way, good use of the available installation space is made possible with satisfactory rigidity of the respective functional sub-areas. A configuration may also be provided in which a hole of such a portion of a functional part is penetrated by a penetrating portion of the same functional part. In addition, it is also contemplated that there may be embodiments in which components of two different functional parts together form a region of the topology of a handle body of at least type one, which is penetrated by a penetrating portion of one of those functional parts or of yet another different functional part. For example, a section of the movable leg could penetrate a frame structure formed by the upper traverse link and the fixed leg.

In another possible embodiment, the type of handle body of the penetrated portion may be two or more, and at least one other hole may be pierced by the other part and/or still another part of the first to sixth parts integrally connected to the penetrated portion. It is also contemplated that each hole of the handle body is penetrated by a portion of a different part.

It may also be provided that, in addition to the one part, at least one further part of the first to fifth parts has a region of the topology of a handle body of at least type one, at least one hole of which is penetrated by at least one other of the first to sixth parts integrally connected to (and facing) this area of the further part. In this regard, too, multiple penetrations can be provided, and the above-explained joint partial use of a local spatial area can be implemented multiple times at different locations.

It is quite possible to think of variants where some functional parts have penetrated areas and others do not. Preferably, the first part has such a penetrated region of the topology of a handle body of at least type one. Further preferably, the fifth portion has such a penetrated region of the topology of a handle body of at least type one. In a further preferred embodiment, the second part also has such a penetrated region of the topology of a handle body of at least type one. Likewise, it may preferably be provided that the third part also has a penetrated area of the topology of a handle body of at least type one.

Furthermore, it can be provided that one or more of the first to fifth parts have an area of the topology of a handle body of type significantly higher than one, the holes of which are partially or even predominantly not penetrated. The first part preferably has an area of the topology of a handle body of at least type two, more preferably at least type four, in particular at least type eight, but it could also have the topology of a handle body of at least type twelve, sixteen, even at least type twenty-four. The second part preferably has an area of the topology of a handle body of at least type two, preferably at least type four, in particular at least type eight. The third and/or the fourth part preferably have an area of the topology of a handle body with type at least two, in particular at least four.

In a further preferred embodiment, the lever arrangement (the fifth part) has a section which, viewed in the longitudinal direction of the structural body, extends in the direction from the movable leg beyond the bending points associated with the fixed leg and thereby extends, viewed in the transverse direction, between the transversely outer ends of these bending points, in particular as a penetrating section. In an alternative embodiment, however, it can also be provided that the lever arrangement does not extend over these bending points in the longitudinal direction, and in particular a sensor including a magnet-coil arrangement is located between the bending points of the movable and fixed legs.

As is common with Roberval mechanisms, bending points (thin bending points) are provided between the fixed leg and the upper traverse link, the fixed leg and the lower traverse link, the movable leg and the upper traverse link and the movable leg and the lower traverse link. In a preferred design, the bending points do not extend continuously from one end to the other as viewed in the transverse direction, but discontinuously. In a particularly preferred embodiment, one, several or all of the bending points are divided into at least two, in particular exactly two, separate transverse sections. In this way, a satisfactory rigidity is achieved, especially in the direction of the load.

Another preferred embodiment has a structural body in which, viewed in projection onto a plane orthogonal to the load direction, a section of the lever arrangement that is particularly predominant as seen in the longitudinal direction lies between material areas of the first part, in particular with a ratio of the transverse extent of the lever arrangement section to the transverse extent of the lever arrangement measured in this first part of less than 0.9, preferably less than 0.8, in particular less than 0.7 over a longitudinal section of at least 40%, preferably at least 60%, in particular at least 80%, even at least 90% of the longitudinal extension of the traverse link. Absolute dimensions of the longitudinal extension of the traverse links, which, in addition to the thickness of the bending points, influence the restoring force of the parallelogram arrangement, are determined depending on the standard load of the load cell for which the structural body is to be used.

In a further preferred embodiment, viewed in a projection onto a plane orthogonal to the transverse direction, an area of the lever arrangement is in particular crossed several times by sections of the fixed leg, in particular a penetrated region and/or a penetrating section. By extending the fixed leg in the transverse direction beyond areas of the lever arrangement, at least in some areas, increased rigidity can be achieved despite the abandonment of a solid structure in favor of struts joined together in one piece.

In a further preferred design, a bearing of the lever arrangement is supported by at least two struts of the first part with different angular positions with respect to the plane orthogonal to the load direction. This allows satisfactory rigidity in the rigid connection of the force-absorbing lever support. Similar supports can be provided for areas of the first part where a mounting coupling of the fixed leg is arranged, such as a mounting hole.

A particularly preferred embodiment has a structural body in which a force transducer of the second part which takes up the weight load to be absorbed is arranged in a bending point, viewed in the longitudinal direction, between the bending points associated on the one hand with the movable leg and on the other hand with the fixed leg, and is supported in particular by at least two struts of the second part with a different angular setting with respect to the plane orthogonal to the load direction, the struts being in particular components of a penetrating section and/or penetrated area. As shown later, for example, with reference to the exemplary embodiments of the figures, a strut of the force transducer support of greater angular adjustment may penetrate the lever of the structural body, and the area between the struts of different angular adjustment may be penetrated by the upper traverse link.

Due to the load receptor being arranged more centrally in this way, a favorable arrangement of the structural body in a weighing device with respect to its, for example, load pan, which is to be connected to the load receptor, can be achieved for various application purposes. In particular, it can be provided that a connection of the load receptor to a support frame of the movable leg runs above the upper traverse link. With regard to the movable leg, it is also provided that a support for a reference weight, such as a reference weight inside the weighing sensor, is provided. In particular, it is preferred that the load introduced via the force transducer as well as the load introduced via the support for the reference weight is introduced into the lever arrangement via the same coupling. A holding unit holding the reference weight when not in use could be supported on the fixed leg, for example via a fastening mechanism, in particular coupled to mounting holes, which is provided for example on cantilevers of the fixed leg.

The above-mentioned bending points, which can have transverse sections spaced apart from each other in the transverse direction, define corner areas in space by means of their respective outer ends in the transverse direction, which or whose convex shell enclose a spatial area of a defined volume. The convex envelope is formed by connecting these outer ends of the respective upper and lower bending points to each other and to the correct side. In a particularly preferred embodiment, it is provided that the product of this volume with the density of the material of the structural body is greater than the mass of the material of the structural body located in this volume by a factor of at least 1.2, preferably at least 1.4, in particular at least 1.75. This factor can also be two or more, in particular 2.5 or more, even 3 or more, even 4 or more.

This aspect is also shown by the invention as being independently advantageous and independent of any penetrations of the functional parts. The invention thus also provides a structural body having the features of the generic term of claim 1, in which the convex shell of the transversely outer ends of the bending points comprises a volume whose product with the density of the material of the structural body is greater than the mass of the material of the structural body located in this volume by a factor of at least 1.2, preferably at least 1.4, in particular at least 1.75. This factor can also be two or more, especially 2.5 or more. Due to the associated material distribution, higher surface moments of inertia and therefore higher bending moments are achieved in relation to the total material used with regard to individual load directions and thus a satisfactory level of rigidity of the functional components of the structural device is achieved in a material-saving manner.

In a preferred embodiment, the maximum extension of the movable leg in the transverse direction is less than that of the fixed leg by at least a factor of 1.125, preferably at least 1.25, in particular at least 1.5. Alternatively or additionally, the transverse extension of the traverse link tapers in the direction of the movable leg with an inclination of 6% or more, preferably 12% or more, in particular 18% or more. This variant is particularly suitable for applications with lower loads. In the case of larger loads in particular, however, it is preferred that the maximum extension of the movable leg in the transverse direction be at most a factor of 1.33, preferably at most 1.25, in particular at most 1.125 less than that of the fixed leg, and may also be greater than the fixed leg, however, preferably no more than the latter factors. In this variant, the diagonal pull of the traverse link is given more relative importance than the mass of the movable leg. Alternatively or additionally, the transverse extension of the traverse link may taper in the direction towards the movable leg with inclination of 6% or more, preferably 12% or more, in particular 18% or more, or taper and/or widen with inclination of not more than 18%, preferably than 12%, in particular than 6% or more. In this context, the invention also provides a set of two or more, preferably 3 or more, structural bodies according to claim 1 with different transverse extension of the movable leg.

In a possible embodiment, among other things with a view to installation spaces, provision can be made for the distance of the upper traverse link from the lower traverse link in the load direction to be smaller than the transverse extent of the bending points between the upper traverse link and the fixed leg, in particular by a factor of more than 1.2, preferably more than 1.4, in particular more than 1.6. However, variants are also envisaged in which this distance is equal to or greater than the transverse extension of the bending points between the upper traverse link and fixed leg and/or movable leg, in particular by a factor of more than 1.1, also more than 1.2, even more than 1.3.

In a particularly preferred embodiment, several, in particular all, of the first to sixth parts are connected to one another in one piece, the components themselves as well as their connection preferably being produced using an additive process.

As is also specifically shown below in the exemplary embodiments, a coil holder, which is attached to the lever of the structural body, is preferably also formed integrally in one piece with the additive method. Preferably, the coil holder is therefore not a separate component to be mechanically connected to the lever.

Accordingly, the invention also relates to the production of a structural body according to any of the aforementioned aspects using an additive process such as a 3D printing process. The specific molding technique is not limited to certain techniques known per se in this respect, for example, strand depositing processes, powder bed processes, selective laser melting (SLM), electron beam melting, ADAM processes, LCM processes, modified powder bed processes (hypoid with intermediate milling) can also be used. Consideration is also being given to using different materials, for example for the bending points, by applying a different powder in a powder bed process at predefined points.

In terms of materials, plastic materials can be used in the same way as metallic materials. For example, a material based on an aluminum compound could be used, such as AlSi10Mg. In a particularly preferred embodiment, it is provided that the iron content of the material is not more than 0.1% by weight, preferably not more than 0.08% by weight, more preferably not more than 0.06% by weight, in particular not more than 0.05% by weight. This ensures less interference effects of the electromagnetic force compensation especially when the coil holder itself is part of the additively manufactured system.

This method of manufacture is also considered by the invention to be advantageous even for designs according to the generic concept of claim 1, in which the individual functional parts are not penetrated by other functional parts in the sense of penetrating the hole of an area from the topology of a handle body, and thus independently and autonomously discloses the manufacture of a structural body according to the generic concept of claim 1 by additive process (3D printing), as well as a structural body of a weighing sensor thus manufactured.

In a particularly preferred process design, the bending points of the Roberval mechanism are reworked in a material-removing machining step following the additive process and thereby brought into their final shape. In addition or alternatively, temporary connecting struts can be created in the additive process, which are later removed again by removing material and are therefore not part of the finished structural body. The latter can be done in particular after the finishing step for the bending points. In a particularly preferred embodiment, the coupling between the movable leg and the lever arrangement (or the lever in the case of only one lever to the lever coupling) is reworked, and/or the bearing for the lever, in particular in the area near this coupling in a material-removing machining step. However, with regard to the thin bending points between the traverse links and the legs, designs are also being considered in which the final production already takes place in an additive process. With regard to these bending points as well as the coupling and the lever bearing, it is preferably provided that these are formed solely by material thin-point areas, i.e., material bridges of lesser thickness, as specifically shown in the exemplary embodiments described below. Preferably, no more complex designs are used, in particular no cross-spring joint designs.

When designing the layout, individual fixed points such as bearings for the levers, bending points, fastening points of the fixed leg can be defined in one step, force flow paths between individual fixed points can be determined in a further step and variations of these can be compared with each other, and in the case of an intersection of two force flow paths or support structures of individual functional components occurring to a desired force flow path arrangement, a design is selected from the topology of a handle body for an area whose hole in the intersection area is penetrated by another of the first to sixth parts, in order to make an installation space area accessible to the other functional part alone in relation to an installation space occupation by one functional part. In this way, the realization of a bionic structure with favorable force conduction in the structure is achieved with a comparatively still small installation space. In a further preferred embodiment, the structural body has at least one receptacle extending predominantly, preferably as a whole, in the transverse direction for temporarily coupling at least two of the first, second and fifth parts (fixed leg, movable leg and lever assembly), mediated by a securing element that can be temporarily inserted into the receptacle. For this purpose, the components forming the receptacle have mutually aligned surface areas as viewed in the transverse direction, in which the boundary of the receptacle is defined. Two or more such receptacles can also be provided. In a preferred embodiment, a receptacle for receiving a securing element is provided, extending over the fixed part, the movable part and the lever. The receptacles may be formed as through holes through the surface areas or as notches that are not completely enclosed so that movement of the parts relative to each other is restricted. By temporarily inserting the securing elements into the receptacles (one or more), undesired loads on and/or undesirably large movements of the parts relative to one another can be avoided if, for example, post-processing is carried out after the additive process.

In this sense, also independently of the exact design of the individual components, a method for producing a structural body of a weighing sensor with the features of the generic term of claim 1 is disclosed as being independently worthy of protection, in which its first to sixth parts are formed in one piece in the additive method and in the additive method at least one receptacle extending predominantly and preferably essentially in the transverse direction is created for the temporary mobility-limiting coupling of at least two of the first, second and fifth parts of the structural body, which can be effected by means of a securing element introduced into the receptacle, the method preferably comprising the working steps, downstream of the additive manufacturing method, of introducing a securing element into the receptacle and removing the securing element again from the receptacle, and material-removing machining of at least the coupling and/or removal of a part-connecting material bridge produced in the additive method preferably taking place during the temporary securing effected by the introduction of the securing element. It is understood that other downstream processing steps (such as attaching parts such as a coil, position sensor, PCB/S, a load introduction interface, a power supply, and/or wiring to assemble the weighing sensor) are also preferably performed while the temporary fuse is active. The safety element could be a safety bolt, for example. If the alignment is not perfect, the holder may have to be machined, e.g., by drilling/milling, to insert the safety element.

An erosion process can be used to release the structural body after the additive manufacturing process. In this context, it is also preferably provided that an end region of the fixed leg that is axial in the longitudinal direction forms a flat surface that extends in the transverse direction and load direction, which can be used as an assembly surface and/or can be formed by such an erosion.

Furthermore, the invention also relates to a weighing sensor, preferably according to the principle of electromagnetic force compensation, which has a structural body formed according to one of the aforementioned aspects. Attachments that can be attached, in particular, to intended attachment points of the structural body include a calibration weight, a calibration stroke, a magnet system, a coil, a sensing device and an electronic circuit. Also included in the invention are weighing devices having one or more such weighing sensors. The principle of electromagnetic force compensation is well known to those skilled in the field, and is therefore not described further here, but reference is made in this respect to, for example, EP 1 726 926 B1, in particular [0008]. Such a weighing sensor is preferably designed for the low-load range, for weighing weights of no more than 1,000 g, preferably no more than 800 g, more preferably no more than 600 g and in particular no more than 500 g. Furthermore, as already mentioned, it is preferred that the lever arrangement has only one lever. As shown below in the embodiments, an arrangement for applying a reference weight is preferably also provided, which is connected to the movable leg and is also formed integrally with the movable leg by the additive process.

BRIEF DESCRIPTION OF THE DRAWINGS

Further features, details and advantages of the invention will be apparent from the following description with reference to the accompanying figures, of which.

DETAILED DESCRIPTION OF EXEMPLARY EMBODIMENT(S)

Figure 1:
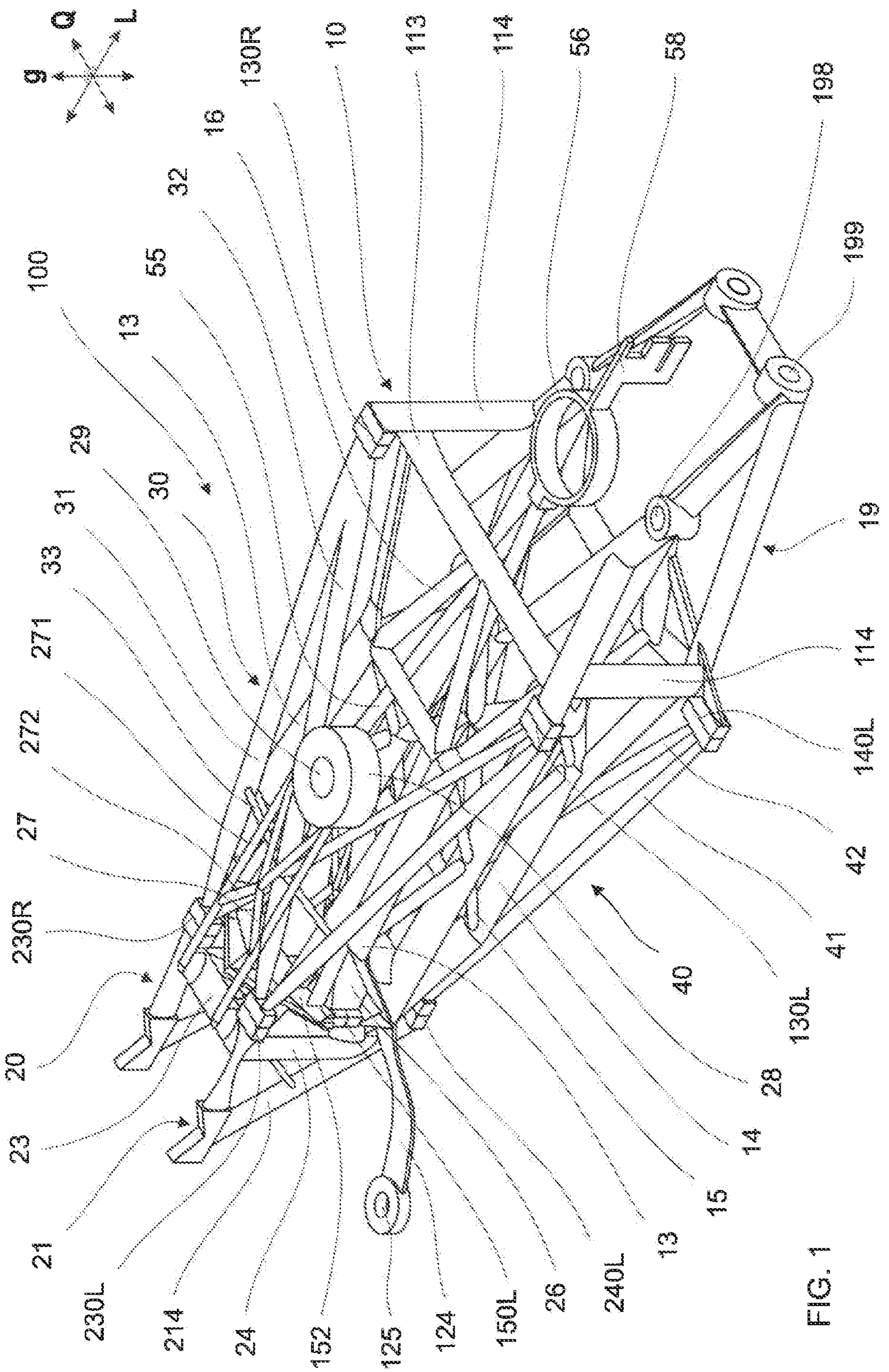
FIG. 1 shows a perspective view of a structural body for a weighing sensor.
Figure 2:
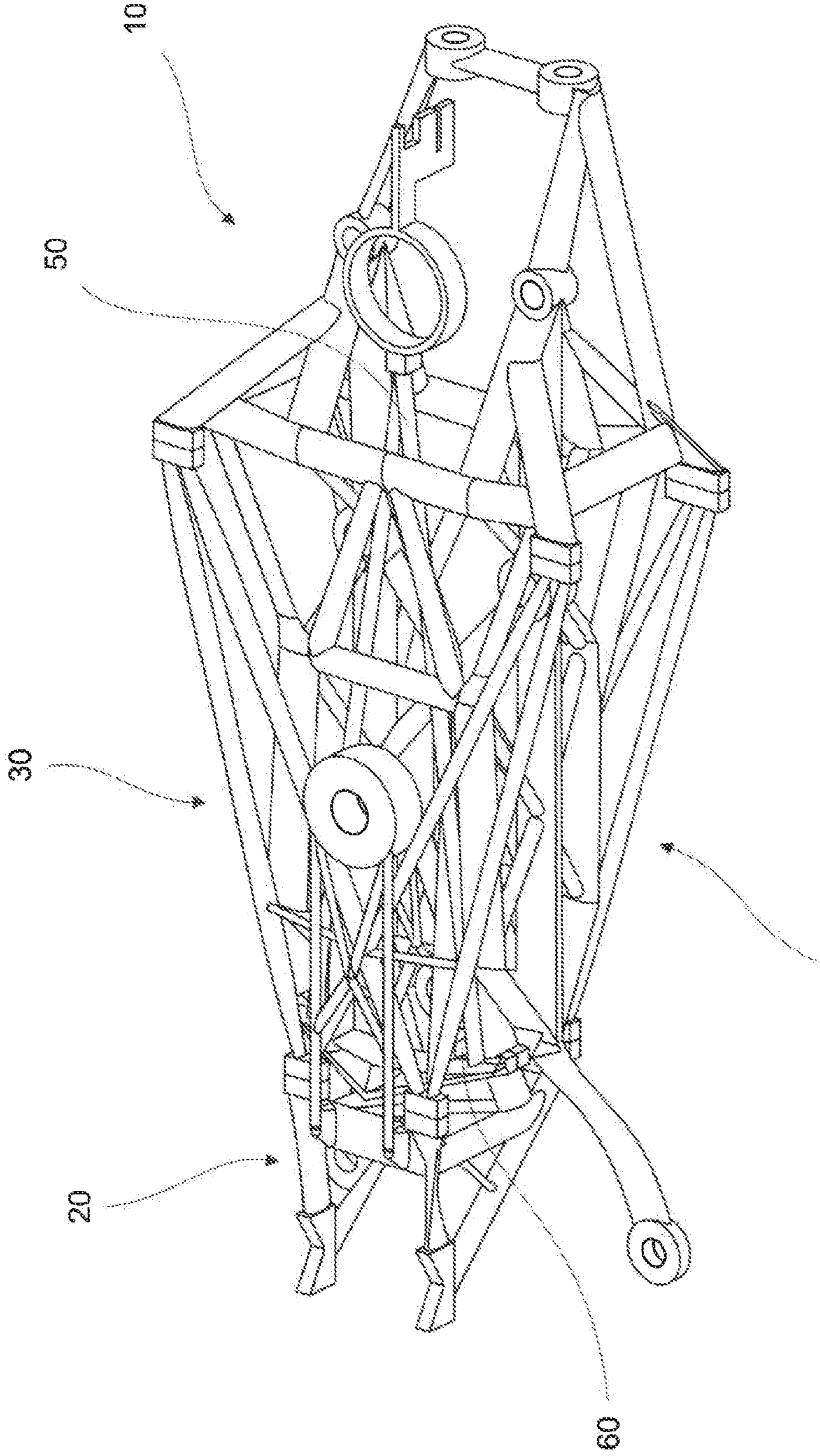
FIG. 2 shows a further perspective view from a different angle.

In the perspective view of FIG. 1, a structural body 100 is shown, the load direction g in this representation is from top to bottom, the longitudinal direction is substantially the diagonal from top left to bottom right, and the transverse direction is the other diagonal.

The upper traverse link 30 of the Roberval mechanism of the structural body 100 is not solid, but is made up of several interconnected struts. In addition, the bending point between the upper traverse link 30 and the fixed arm 10 is split in the transverse direction into the two separate transverse sections 130R, 130L, as is the bending point between the upper traverse link 30 and the movable arm 20. One longitudinal strut 31 of the upper traverse ink 30 connects the transverse sections 130R, 230R or 130L, 230L of the bending points between the upper traverse link 30 and the fixed arm 10 and the movable arm 20, which are assigned to each other in the transverse direction Q. Diagonal struts 32 respectively connect the diagonally opposite transverse sections 130R, 230L and 130L, 230R. At the level of the intersection of the diagonal struts, cross struts 33 are still arranged between the diagonal struts 32 and the longitudinal struts 31.

Due to the inclination relative to the longitudinal direction L, the upper traverse link 30 tapers from the side of the fixed leg 10 towards the movable leg 20. In the illustrated embodiment, the transverse extension of the bending point 230 is smaller than the transverse extension of the bending point 130 by a factor of approx. 2.75. This tapering can be clearly seen again in FIG. 5, in which the normal plane is the viewing direction in the longitudinal direction from the movable leg 20 to the fixed leg 10. The inclination of the longitudinal struts 31 to the longitudinal direction is approx. 18.5° in this embodiment example.

The lower traverse link 40 is of the same structure as the upper traverse link 30 with longitudinal struts 41, diagonal struts 42 and cross struts 43, and connects between the bending point cross sections 140L, 140R toward the fixed arm 10 and 240L, 240R toward the movable arm 20.

Figure 5:
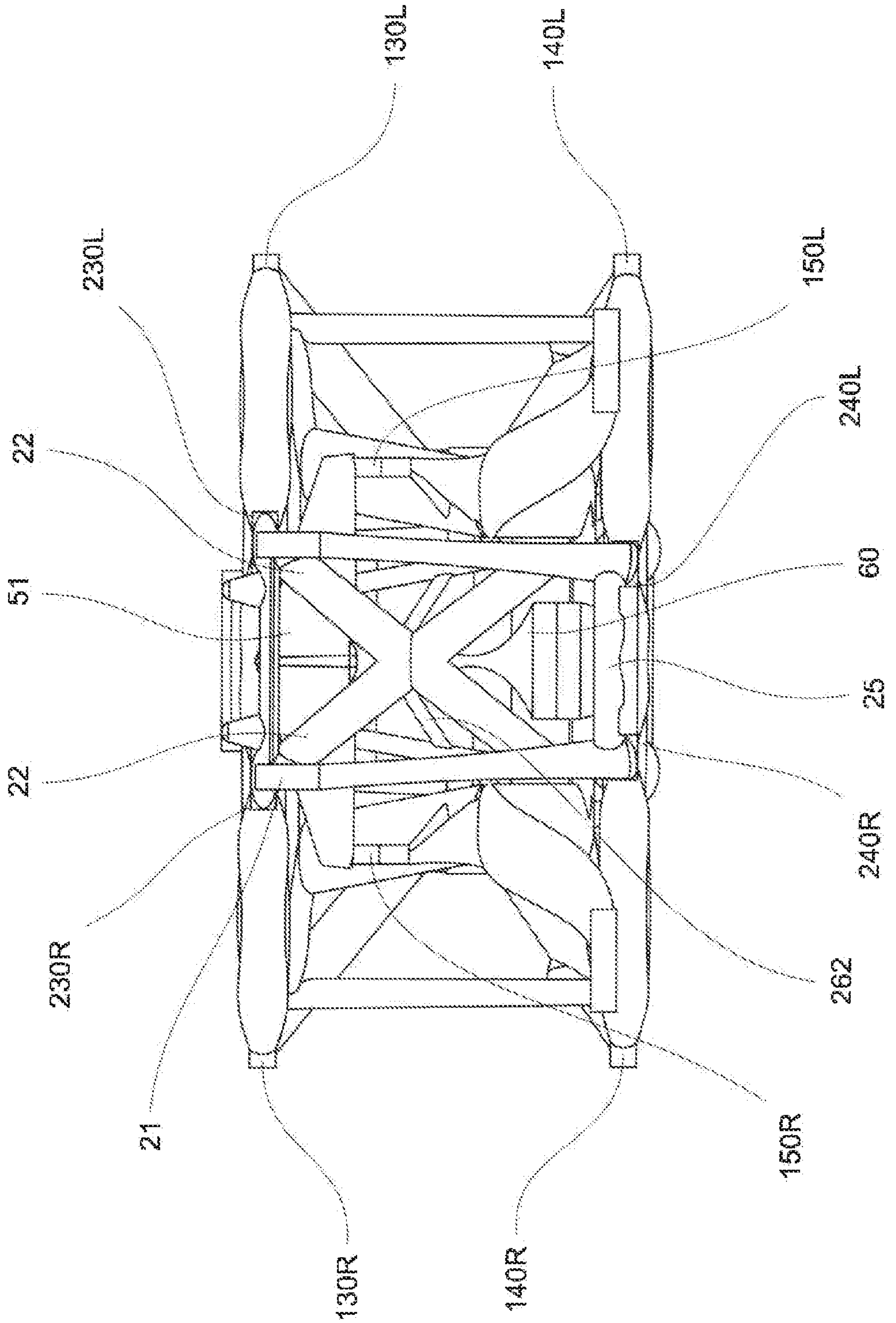
FIG. 5 shows the structural body in a plan view from behind (in the longitudinal direction)

The movable leg 20 has a support frame lying essentially in the plane spanned by the load direction g and the transverse direction Q, with an upper transverse strut 23, at the lateral ends of which vertical struts 24 extend in the load direction, and with two diagonal struts 22 forming a support cross (see FIG. 5). To accommodate the load to be measured, a load sensor 28 is provided with a bore 29, in the example shown a circular disc, which is connected to the cross brace 23 via a linkage 27. In this embodiment, the linkage 27 has two longitudinal struts 271 anchored to the crossbar 23, which are connected to each other by two diagonal struts 272 forming a support cross. In this embodiment, the load receptor 28 and linkage 27 are above the upper traverse link 30. In addition, the load receptor 28 is supported by two more solid support struts 26, which are fixed to a lower area of the vertical supports 24. The direction of extension of the support struts 26 contains directional components both in the load direction g, longitudinal direction L and transverse direction Q and these are therefore referred to as spatial diagonal supports 26. As can be seen from FIG. 3, the spatial diagonal supports 26 run orthogonally to the transverse direction (in FIG. 3 the transverse direction is the normal to the paper plane) at an angle of about 23° to the longitudinal direction L in the example shown in the figure. The two spatial diagonal supports 26 are also connected by diagonal struts 262 (see FIG. 5) forming a support cross. The load receptor 28 is rigidly connected to the carrier frame 23, 24, 22 via the spatial diagonal supports 26 and the linkage 27. A diagonal strut 32 of the upper link 30 penetrates an opening defined by a spatial diagonal strut 26, the load receiver 28, a longitudinal strut 271, the transverse strut 23 and a vertical strut.

In this embodiment, the position of the transverse sections of the bending points to the upper traverse link 30 is arranged approximately at the level of the intersection of the vertical supports 24 and the transverse support 23 of the movable leg 20, that of the bending point transverse sections to the lower link 40 via a bent extension of the vertical support 24, whose ends are connected by a further (lower) crossbar 25. In the illustration shown, the bending points 130, 140, 230, 240 do not yet appear as thin points; their formation, starting from the structural body shown, still takes place in a material-reducing processing step.

In the transverse direction, starting centrally from the cross strut 25, the connection runs to the coupling 60, which couples the movable leg 20 to the lever 50 of the lever arrangement consisting of only one lever in this embodiment. The extension of the coupling 60 in the longitudinal direction can be seen clearly in FIG. 3, in a direction Q the coupling 60 is again considerably reduced in width, see FIG. 5.

Figure 6:
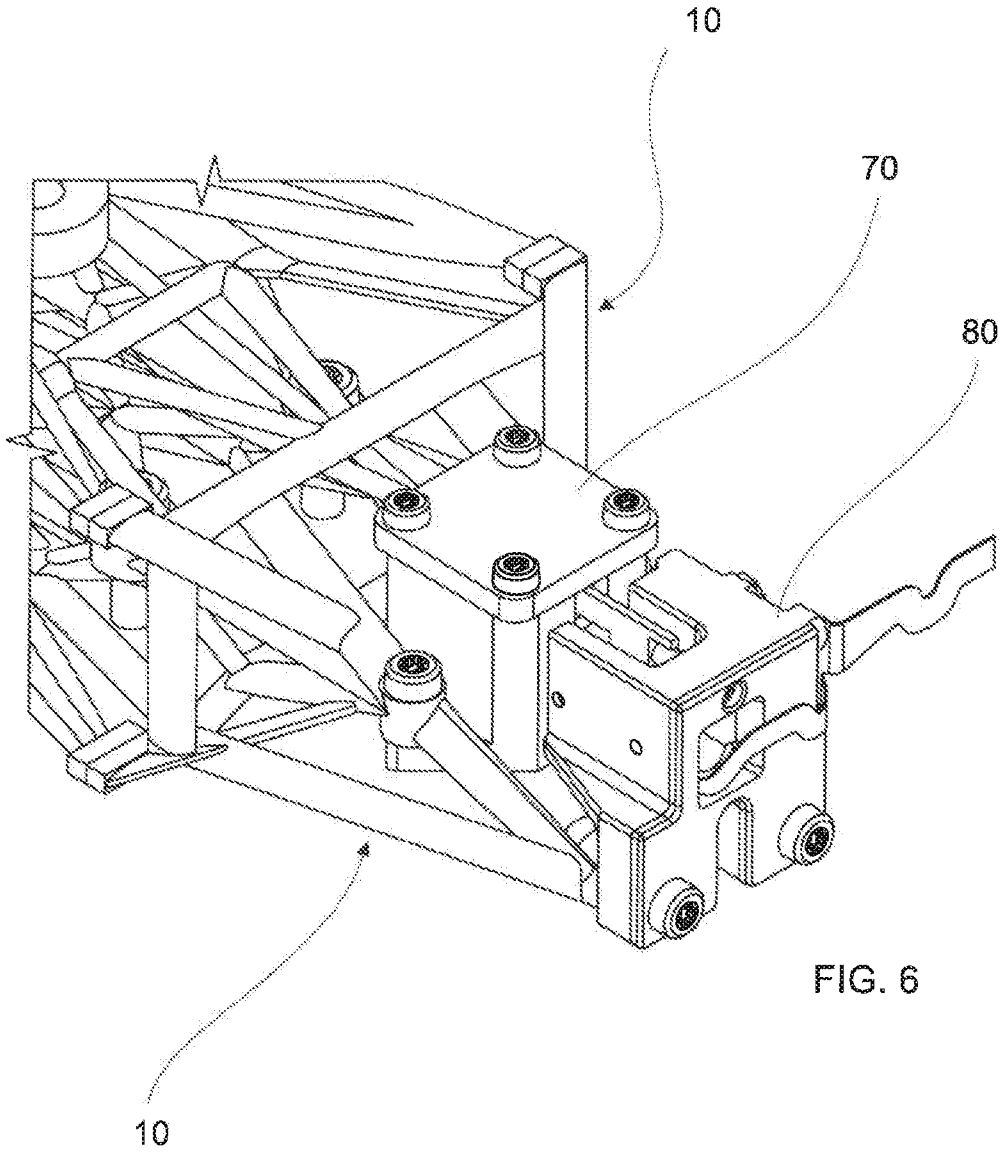
FIG. 6 shows a section of FIG. 1 with attachments to the weighing sensor.

The lever 50 is designed as a two-armed lever, to whose short arm 51 directed towards the movable leg 20 the coupling 60 couples from below, and with a long lever arm 54, at whose far end a coupling 56 is provided for the electromagnetic force compensation (FIG. 6) of the weighing sensor. The free end 58 is used to determine the position for the position sensor (FIG. 6) as is common in the state of the art. However, the invention is not limited to lever arrangements with only one lever. A multiple lever system could also be formed, in particular with two or three levers; the use of installation space according to the invention is also advantageous for this.

As can be clearly seen in FIGS. 1 and 5, the lever is supported on the fixed leg 10 split at a left bearing point 150L and a right bearing point 150R, as viewed in the transverse direction (the L and R for "left" and "right" are based on the illustration in FIG. 1 and are therefore not consistent with the illustration in FIG. 5 with regard to the left and right directions there). As can be seen particularly well from FIG. 3, the bearing points 150R, 150L are arranged very close to the support frame 23, 24, 22, 25, measured from the bending points 130, 140 towards the fixed leg 20, the bearing 150 is approximately at a distance of over 90% of the extension of the traverse links 30, 40 in the longitudinal direction L.

The short lever arm 51 of the lever 50 has, and is substantially formed from, a transverse reinforcement 152 extending between the bearing 150L and 150R, which in this embodiment is formed in a substantially triangular shape in projection orthogonal to the load direction g, with the coupler 60 coupling at the free end, approximately at the apex of the triangle with an obtuse angle.

The long lever arm 54 consists over a large part of its longitudinal extent of two longitudinal struts 55, which converge near the coupling 56 and widen in the direction of the transversely separate bearing points 150L, 150R and fan out again near these bearing points. The free end of the long arm 54, formed integrally with the entire lever 50, extends longitudinally across the bending points 130, 140, penetrating a vertical support frame 11 of the fixed leg 10.

Figure 3:
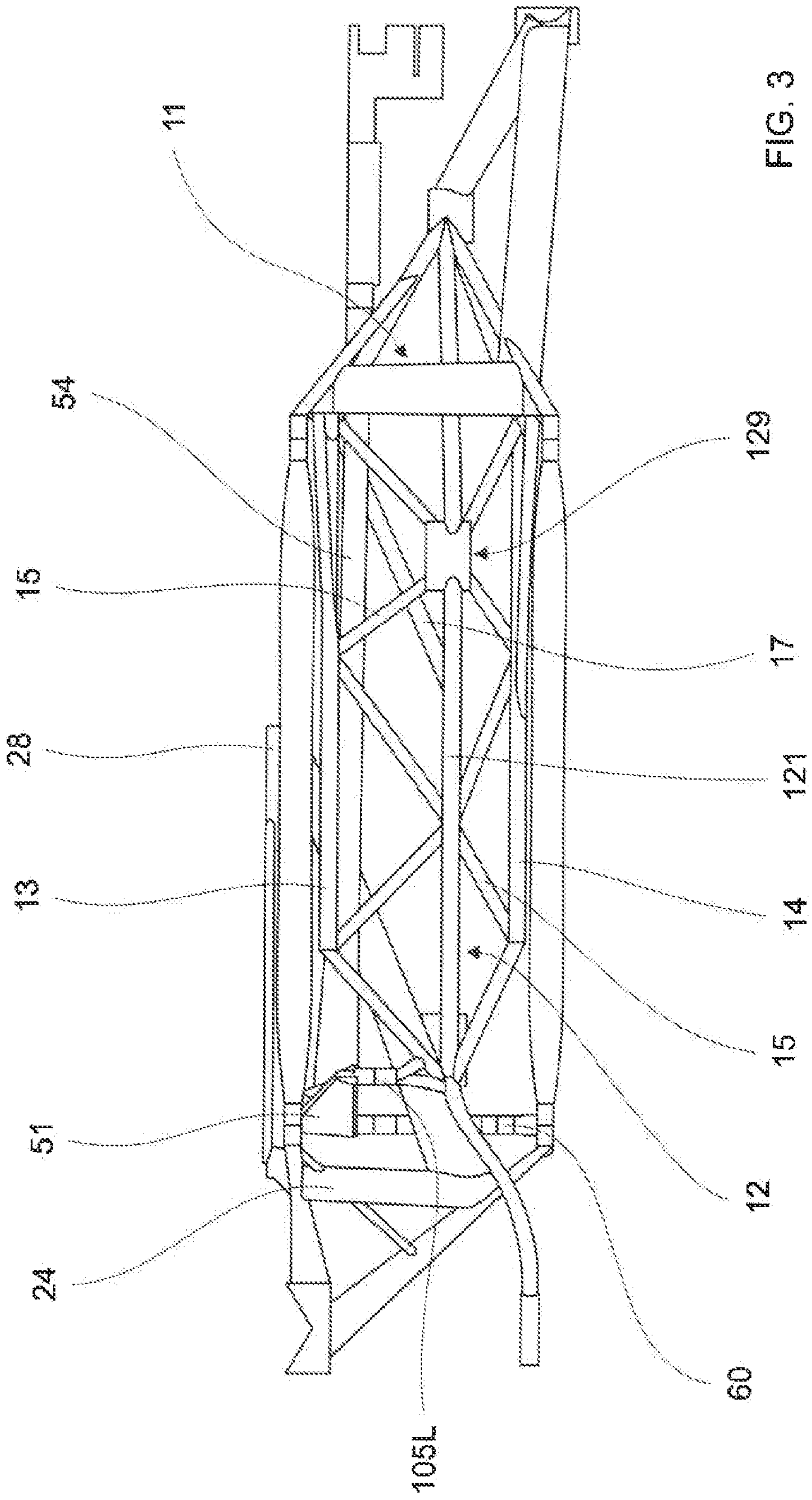
FIG. 3 shows a side view of the structural body.

The fixed leg 10 has a vertical frame 11 extending essentially in the plane orthogonal to the longitudinal direction and a horizontal frame 12 extending towards the movable leg 20 essentially in a plane orthogonal to the load direction (FIG. 3).

The vertical frame has two transverse struts 113 and two vertical struts 114, near whose respective connections the bending points 130, 140 are arranged. An opening defined by the upper cross brace 113 and the diagonal brace 32 of the upper link 30 is penetrated by the diagonal supports 26 of the movable leg 30. The horizontal frame 12 has, as can best be seen from a combination of FIGS. 3 and 4, two substantially parallel longitudinal struts 121, near the far end region of which a transverse strut 123 is provided. In this embodiment, each of these struts 121, 121 and 123 is provided with a mounting hole 129, via which the structural body can be fastened to the weighing device. At about the height of the mounting holes 129, a cross brace 128 connecting the longitudinal struts 121 is attached.

Mounting holes 125 are provided on arms 124 of the horizontal frame, via which an arrangement for applying a reference weight can be attached. The reference weight (not shown) can be placed on a support 21 which is rigidly connected to the vertical supports 24 of the movable leg 20 via a linkage 214. In this embodiment, both the load of a weight to be measured applied to the load receptor 28 and the load of a reference weight applied to the support 21 are transmitted via the same coupling 60 between the movable leg 20 and the lever 50.

Viewed in the transverse direction Q, the longitudinal struts 121 of the horizontal frame are flanked on both sides by a lower longitudinal strut 14 and an upper longitudinal strut 13, which is connected to the respective longitudinal strut 121 via diagonal struts 15 viewed in relation to the plane orthogonal to the transverse direction. The transverse struts 13 are connected to one another and to the transverse strut 113 of the vertical frame via further struts forming a support triangle 16. In addition, a diagonally running strut 17 connects the traverse strut 113 to the horizontal frame 12 via the support cross 128. The diagonal support 17 penetrates the opening defined by the longitudinal struts 55 and transverse reinforcement 152 of the lever 50, so that the lever 50 and the fixed leg 10 penetrate each other. The assembly area with the assembly hole 129 of the cross strut 123 is also connected to the support cross 128 and the longitudinal struts 121 via a support cross running in longitudinal and transverse direction. It can be seen that the assembly areas are supported multiple times by struts, as are the bearing points 150R, 150L.

Figure 4:
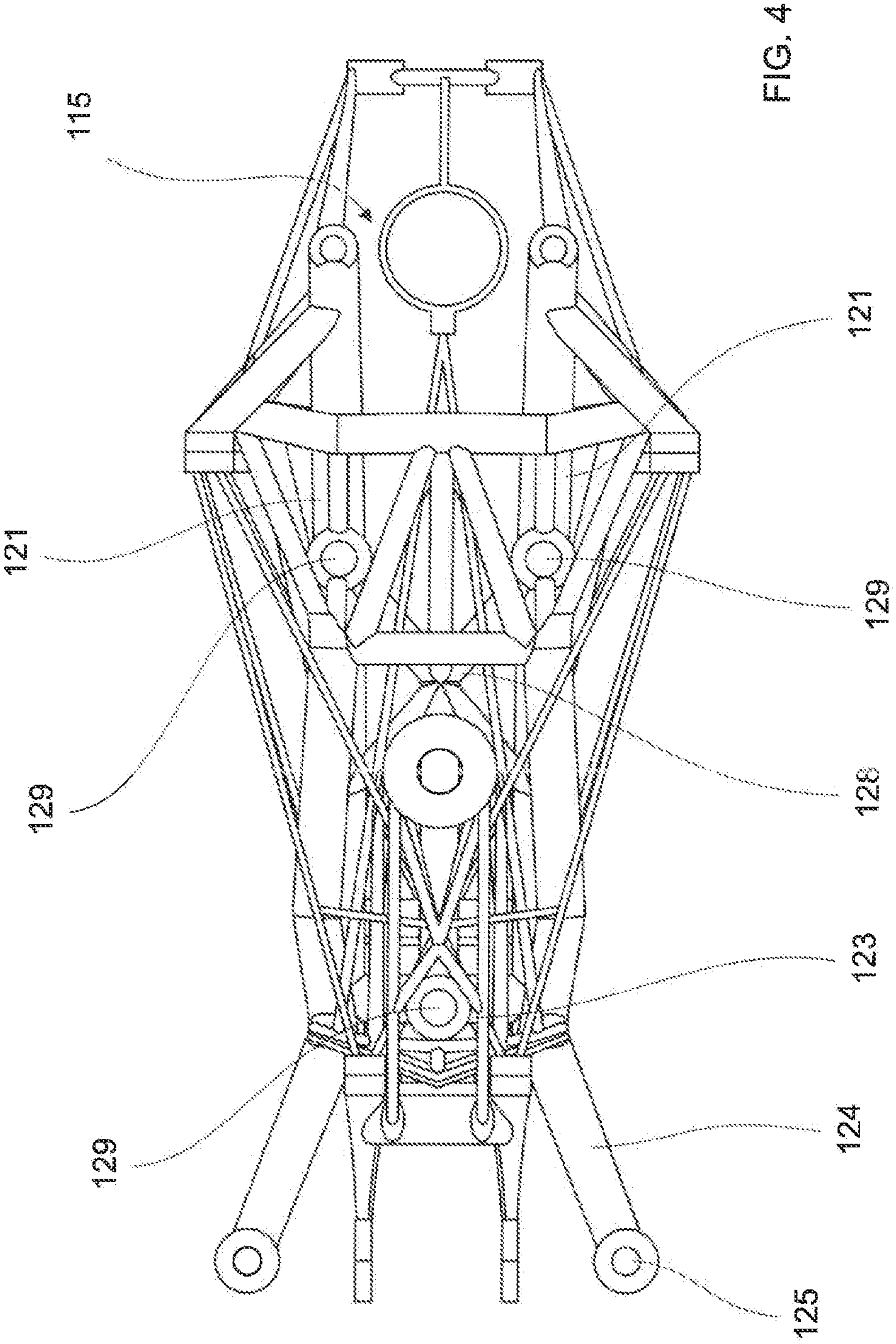
FIG. 4 shows the structural body in a plan view in the load direction.

The longitudinal struts 13, 121 and 14 are thus, as can be seen particularly well from FIG. 4, seen in the transverse direction further out than the lever 50 with respect to the centrally arranged lever 50.

On the side of the vertical frame 11 facing away from the movable leg 20, mounting bores 198 for the magnet-coil arrangement of the electromagnetic force compensation 70 with magnet and coil are provided via a linkage 19, with the coil being attached to the coil holder 56, as well as mounting bores 199 for the position sensor 80 interacting with the free end 58 of the lever 50. This assembly condition is shown pictorially in the section of FIG. 6. It is understood that corresponding mounting couplings in the case of a magnet-coil arrangement arranged on the other side of the vertical frame 11 would then be arranged on the side facing the movable leg 20.

All of the components 10, 20, 30, 40, 50 and 60 shown in FIGS. 1 to 5 have been created together as a single unit in this embodiment example by means of the additive manufacturing process. As already mentioned, it can be provided in one design that the final shape of the thin bending points at the bending points between the levers and the legs of the Roberval mechanism are produced by material-removing processing starting from the material area formed additively there. Alternatively, in another design, fully additive manufacturing is also provided. Materials for the structural body 100 may include plastic materials as well as metallic materials. All parts can be made of the same material, but the use of different materials is also considered, such as forming the bending points from a different material than the other areas.

Another exemplary embodiment is described with reference to FIGS. 7 to 9. The structural body 100' shown in FIG. 9 in a slightly perspective view has also been produced by an additive process, in this embodiment from a 3D printable powder, in this example using AlSi10Mg with iron contents of less than 0.05 weight %.

The structural body 100' is also built according to the principle of the Roberval mechanism, with a fixed leg 10', a movable leg 20', and an upper traverse link 30' and a lower traverse link 40' (the same reference numerals are used for the second embodiment for the same components, but as primed references).

Figure 8:
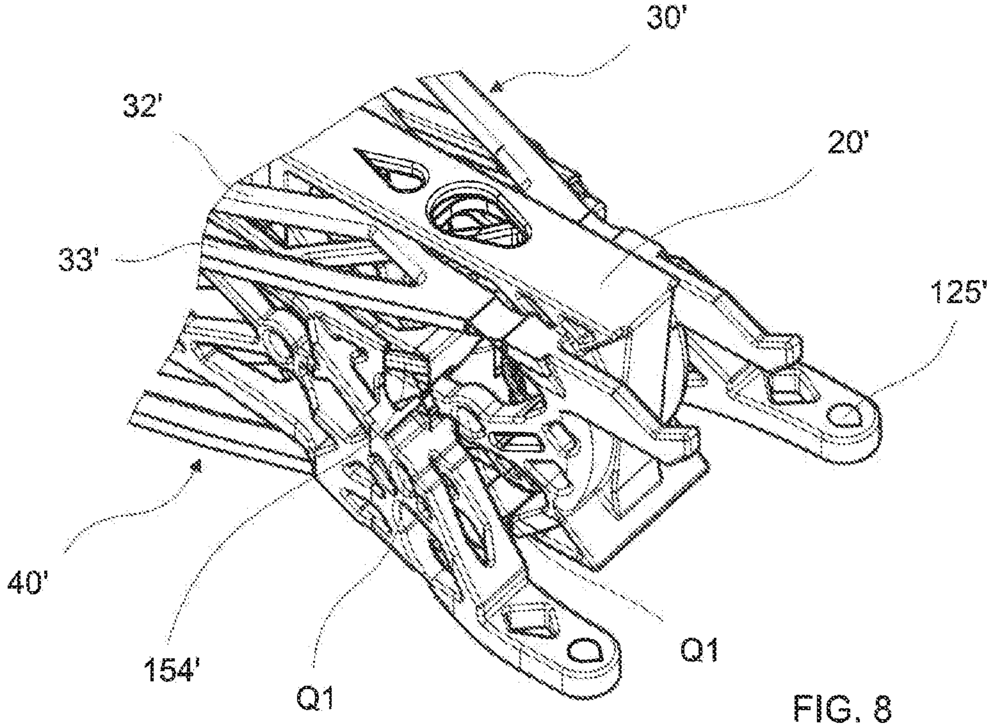
FIG. 8 shows a perspective view of an end portion to the movable leg of that other structural body.

It is easier to see from FIG. 8 that the expansion of the movable leg 20' in the transverse direction Q is again less than that of the fixed leg 10'. The positions of the thin bending points 130R', 130L', 230R' and 230L' again form a trapezoid.

As in the first embodiment, the load receptor 28' is connected to an axial end area of the movable leg 20' not only via a linkage 27' approximately parallel to the upper traverse link 30', but also via diagonal struts extending obliquely in the plane orthogonal to the transverse direction Q, which are connected to the region of the movable leg located further down, as viewed in the load direction, and thereby penetrate regions of the lever 50'. A region of the movable leg 20' between the connections towards the load receptor 28', seen in projection orthogonally to the transverse direction, is penetrated by a region of the upper traverse link 30' (FIG. 8). In this exemplary embodiment, the upper traverse link 30' has two struts 32', 33' on the right and left side, which extend essentially in the longitudinal direction with a diagonal component, the struts 32' from the right and left side in the area of penetration of the movable leg 20' are connected to each other.

In contrast to the first exemplary embodiment shown, the coil-side end of the lever 50' does not protrude beyond the frame structure 114' of the fixed leg 10'. In this way, the frame structure 114' can be formed as a flat contact surface at the axial end side as viewed in the longitudinal direction. At the location of the surface F, the structural body can be detached from the apparatus after its production, for example, by erosion. Nevertheless, as in the first embodiment, the coil holder 56' and the free lever end 58' provided for sensor coupling are an integral part of the additively manufactured structural body 100' and not an additional component coupled to it only after the structural body 100' has been manufactured.

Figure 9:
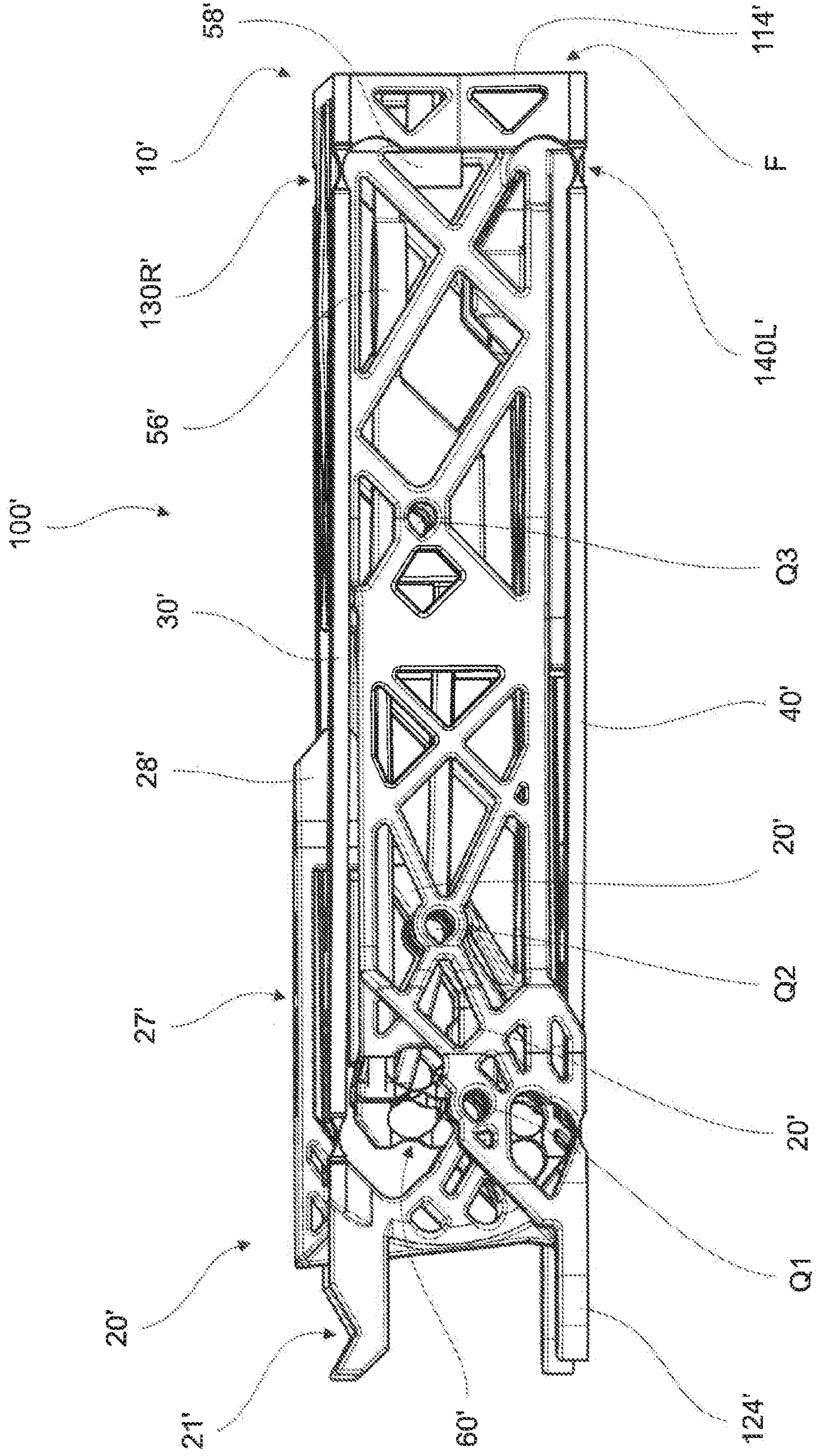
FIG. 9 shows the other structural body in a slightly perspective view compared with a purely side view.

As in the first embodiment, the connections between the traverse links 30' and 40' with the fixed and movable legs 10', 20' are formed by thin areas in the sense of a thin material bridge (see 130R', 140L' in FIG. 9). These can exist in their final configuration through mechanical reworking, or can already be created using an additive process.

Figure 7:
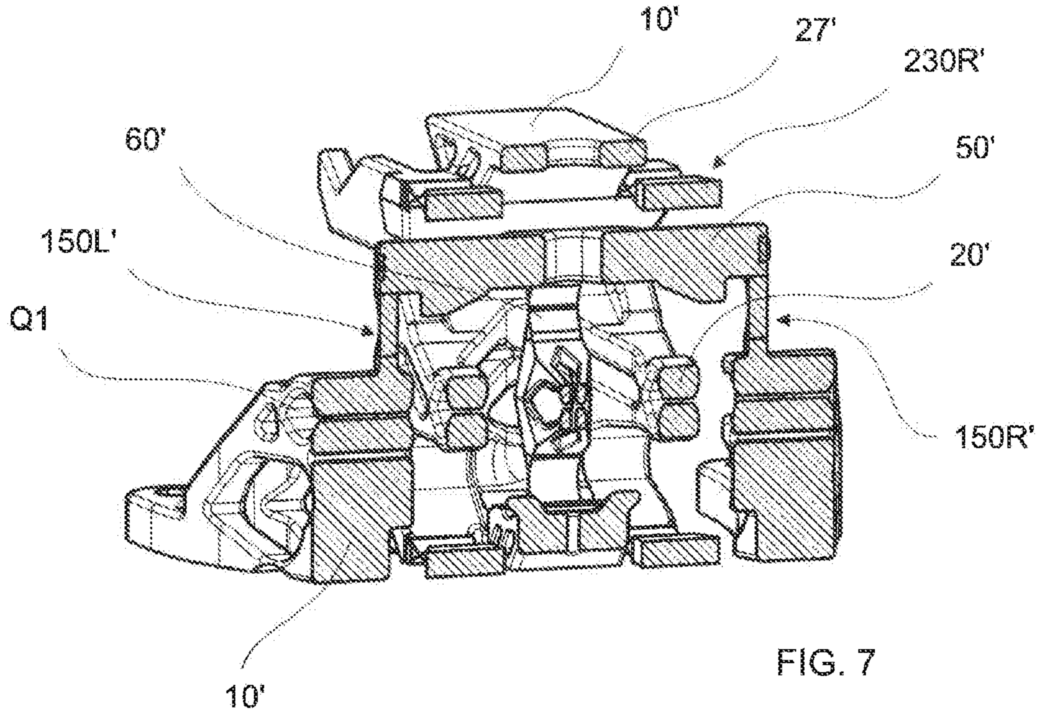
FIG. 7 shows a partial sectional view of a portion of another structural body near the movable leg.

On the other hand, for the couplers 60' and bearing points 150L', 150R', which are best seen from FIG. 7, it is envisaged that their final dimensions are produced by mechanical finishing operations, for example milling with several milling cutter machining steps placed one after the other, the overlapping contours of which form the contour of the couplers/bearing points.

For any post-processing after the production of the structural body 100' in the additive process, moving parts are preferably temporarily secured against one another. This can be done by forming the locking pin receptacles Q1, Q2 and Q3, shown in FIG. 9, in material areas of the parts to be secured against each other to accommodate screw pins (not shown) while still in the additive process. For this purpose, the fixed leg 10', the movable leg 20' and/or the lever 50' have overlapping surface areas, viewed in projection orthogonal to the transverse direction, through which the locking pin receptacles Q1, Q2, Q3 pass. Here, Q1 passes through areas of the fixed leg 10' and the movable leg 20' in the vicinity of the bearing points 150' (traversing the coupler in a central region). A safety pin guided by Q1 can protect the coupler when machining the bearing points (top and bottom) and when separating material webs. Q2 runs both through areas of the fixed leg 10' and through areas of the lever 50' and also through the oblique connection of the movable leg 20' to the load receiver 28', which has already been explained above.

This configuration is also designed for the low-load range, for loads of preferably less than 1,000 g, in particular less than 500 g. Although arrangements with several levers are possible in principle, the one with only one lever 50' is also preferred in this embodiment. As in the first embodiment, it is preferably provided that material webs (see for example 154' in FIG. 8) are still formed during the additive manufacturing process, which in particular connect the lever 50' to other components, such as the fixed leg 10' or the upper traverse link 30', and are only removed subsequently, for example when the securing is produced via the securing pin receptacles Q1, Q2, Q3.

In this way, necessary post-processing steps such as cutting threads for fastening holes or milling removal of manufacturing-related support structures that the final structural body should not have, or additional safeguards, for example in the form of material webs such as the aforementioned lever safety device, are fastened without damaging effects on the sensitive lifting structure and its coupling. The attachment of the other components such as the coil or the wiring can also be carried out before the fuse pins inserted into the locking pin receptacle Q1, Q2, Q3 are removed, i.e., the temporary securing is removed.

Thus, in the finishing process after 3D printing a structural body, the following steps can be performed, for example: (1) attaching the locking pins, (2) post-processing the bearing points and/or couplers by machining, for example, and removing the material webs, (3) the further assembling a load cell module with the structural body as a basic part, by adding one or more of coil, position sensor, PCB/S, load application interface, power supply, wiring, etc., (4) removing the locking pins before operation.

Due to its design with numerous longitudinal, transverse and vertical struts as well as diagonal struts, the structural body 100 is constructed with a comparatively low mass in relation to the overall extent of the structural body but nevertheless has high rigidity and allows an extended possibility of using local installation space areas through the penetration of different functional components, which allows the positioning of components of the individual functional parts to be more variable and allows favorable configurations for controlling the flow of the power paths.

The invention is not limited to the embodiments shown in the illustrated example. Rather, the features of the foregoing description and of the claims below may individually, and in combination, be essential to the realization of the invention in its various embodiments.

LIST OF REFERENCE SIGNS

- 10 Fixed leg
- 11 Vertical frame
- 12 Horizontal frame
- 13 Longitudinal strut
- 14 Longitudinal strut
- 15 Diagonal strut
- 16 Support triangle
- 17 Diagonal strut
- 19 Linkage
- 20 Movable leg
- 21 Support reference weight
- 22 Diagonal strut
- 23 Traverse strut
- 24 Vertical strut
- 25 Traverse strut
- 26 Spatial diagonal strut
- 27 Linkage
- 28 Load receptor
- 29 Hole
- 30 Upper traverse link
- 31 Longitudinal strut
- 32 Diagonal strut
- 33 Traverse strut
- 40 Lower traverse strut
- 41 Longitudinal strut
- 42 Diagonal strut

43 Traverse strut
50 Lever
51 Short lever arm
54 Long lever arm
56 Coil holder
58 Free lever end
60 Coupling
70 Electromagnetic force compensation
80 Position sensor
100 Structural body for weighing sensor
113 Traverse strut
114 Vertical strut
121 Longitudinal strut
123 Traverse strut
124 Outrigger
125 Assembly hole
128 Support cross
129 Assembly hole
130L, 130R Bending point
140L, 140R Bending point
150L, 150R Bearing position
152 Transverse reinforcement
198 Assembly hole
199 Assembly hole
214 Linkage
230L, 230R Bending point
240L, 240R Bending point
262 Diagonal strut
271 Longitudinal strut
272 Diagonal strut
g Load direction
L Longitudinal direction
Q Transverse direction
Q1, Q2, Q3 Locking pin receptacle
F Surface

The invention claimed is:

1. A structural body of a weight sensor with a Roberval mechanism, said structural body comprising:
a first part with a fixed leg of the Roberval mechanism;
a second part with a movable leg of the Roberval mechanism;
a third part with an upper traverse link of the Roberval mechanism;
a fourth part with a lower traverse link of the Roberval mechanism;
a fifth part comprising a lever arrangement connecting the movable leg to an output side serving for sensory measurement; and
a sixth part with a coupler coupling the movable leg to the lever arrangement;
wherein at least one of said first part, said second part, said third part, said fourth part, and said fifth part comprises a region of a topology of a handle body of at least type one, at least one hole of which is penetrated by at least one portion, integral with said region, of another one of said first part, said second part, said third part, said fourth part, and said sixth part.

2. The structural body of claim 1, wherein:
the type of the handle body of the penetrated portion is two or more;
at least one other hole is penetrated by the other one of said first part, said second part, said third part, said fourth part, and said sixth part; and
yet another part of the first part, said second part, said third part, said fourth part, and said sixth part is integrally connected to the penetrated portion at least in sections thereof.

3. The structural body of claim 1, wherein:
in addition to said at least one of said first part, said second part, said third part, said fourth part, and said fifth part, at least one further part of said first part, said second part, said third part, said fourth part, and said fifth part has a region of the topology of the handle body of the at least type one, at least one hole of which is penetrated by at least one other of said first part, said second part, said third part, said fourth part, said fifth part, and said sixth part and is integrally connected to said region of said at least one further part.

4. The structural body of claim 1, wherein:
the lever arrangement has a portion which, viewed in the longitudinal direction of the structural body, extends in a direction away from the movable leg beyond bending points associated with the fixed leg and, viewed in the transverse direction, extends between transversely outer ends of the bending points, as a penetrating portion.

5. The structural body of claim 1, wherein: viewed in projection on a plane orthogonal to the transverse direction, a region of the lever arrangement is crossed by portions of the fixed leg, including at a penetrated region or by a penetrating portion.

6. The structural body of claim 1, wherein:
viewed in projection onto a plane orthogonal to the load direction, a section of the lever arrangement viewed in the longitudinal direction (L) lies between material areas of the first part, with a ratio of transverse extent of sections of the lever arrangement to the transverse extent of the lever arrangement measured in this first part of less than 0.9, over a longitudinal section of at least 40% of the longitudinal extension of the traverse link.

7. The structural body of claim 1, wherein:
a force transducer of the second part, which is configured to absorb the weight load, viewed in the longitudinal direction between the movable leg on one side and the fixed leg on the other side associates bending points and is supported by at least two struts of the second part with different angles to a plane orthogonal to the load direction; and
the struts are components of a penetrating portion or penetrated area.

8. The structural body according to claim 1, wherein:
the bending points to a side of the fixed leg or the movable leg for the upper traverse link or the lower traverse link viewed in the transverse direction from each other have spaced transverse sections.

9. The structural body of claim 1, wherein:
the convex shell of the bending point portions or transversely outer ends of the bending points comprises a volume whose product with a density of the material of the structural body is greater than a mass of the material of the structural body located in the volume by a factor of at least 1.2.

10. The structural body of claim 1, wherein:
a maximum extension of the movable leg in a transverse direction is less than that of the fixed leg by at least a factor of 1.125.

11. The structural body of claim 1, wherein:
a plurality of the first part, the second part, the third part, the fourth part, the fifth part, and the sixth part are integrally joined to one another.

12. A method of producing the structural body of claim 1 using an additive manufacturing process.

13. The method of claim 12, wherein:

temporary connecting struts are created in the additive manufacturing process; and following the additive manufacturing process, the bending points of the Roberval mechanism are reworked in a material-reducing machining step where the temporary connecting struts created in the additive manufacturing process are subsequently removed by the material-reducing machining step.

14. A weighing sensor using principles of electromagnetic force compensation, with the structural body according to claim 1.

15. A weighing device comprising the weighing sensor of claim 14.

16. A method of manufacturing a structural body of a weighing sensor having a Roberval mechanism, said method comprising:

forming the structural body using an additive process, said structural body comprising:

a first part with a fixed leg of the Roberval mechanism;

a second part with a movable leg of the Roberval mechanism;

a third part with an upper traverse link of the Roberval mechanism;

a fourth part with a lower traverse link of the Roberval mechanism;

a fifth part comprising a lever assembly connecting the movable leg to an output side serving for sensory measurement; and a sixth part with a coupler coupling the movable leg to the lever assembly;

wherein said first part, said second part, said third part, said fourth part, said fifth part, and said sixth part are formed in one piece in the additive process;

wherein at least one receptacle extending predominantly in a transverse direction is created in the additive process to provide a temporary mobility-limiting coupling of at least two of the first part, the second part, and the fifth part of the structural body by a securing element introduced into the at least one receptacle.

17. The structural body of claim 1, wherein at least said first part, said second part, said third part, said fourth part, said fifth part, and said sixth part are formed together as a single, monolithic piece.

18. The method of claim 16, wherein at least said first part, said second part, said third part, said fourth part, said fifth part, and said sixth part are formed together as a single, monolithic piece.

* * * * *